F. FLEMING.
PIPING SYSTEM.
APPLICATION FILED APR. 18, 1914.

1,160,703.

Patented Nov. 16, 1915.
2 SHEETS—SHEET 1.

WITNESSES:
Frank H. Carter
Th. A. Stock

INVENTOR
Frank Fleming
BY
Harry C. Schroeder
ATTORNEY

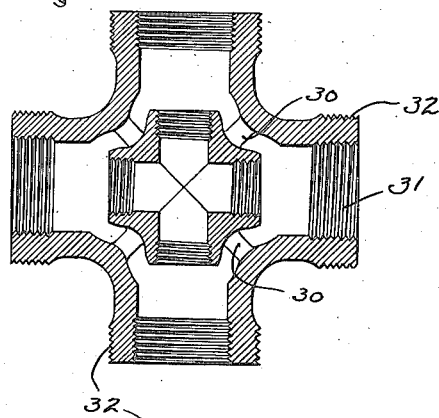
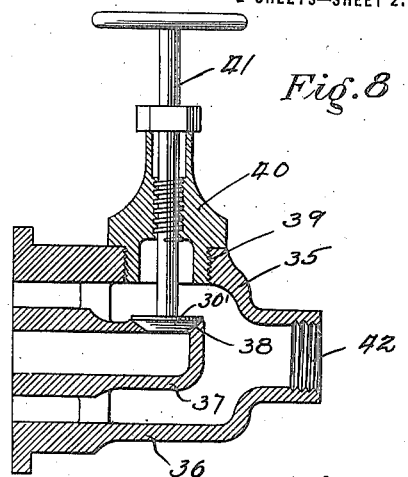
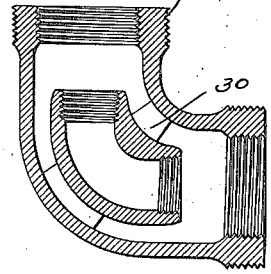
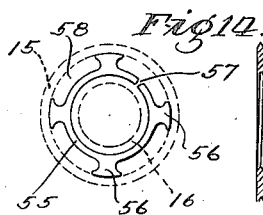
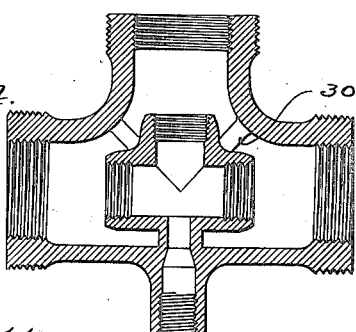
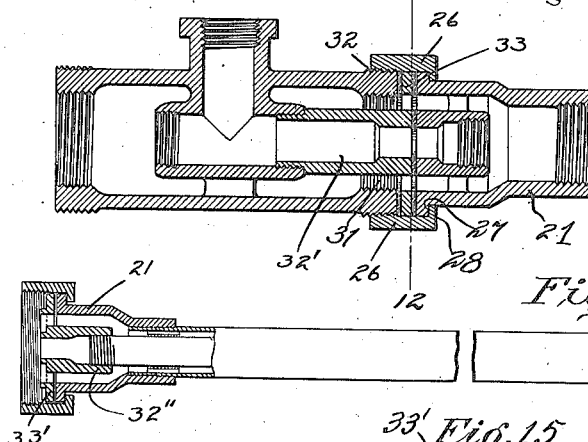
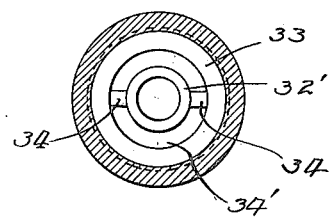
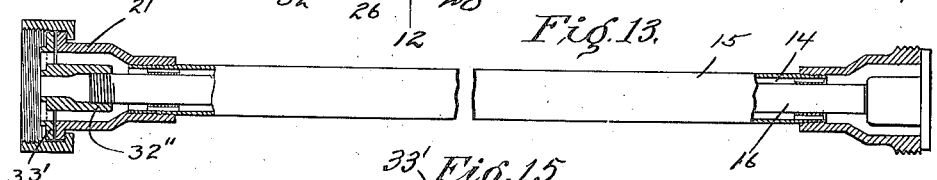
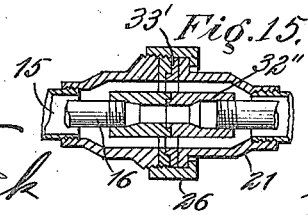

UNITED STATES PATENT OFFICE.

FRANK FLEMING, OF SACRAMENTO, CALIFORNIA.

PIPING SYSTEM.

1,160,703.

Specification of Letters Patent.

Patented Nov. 16, 1915.

Application filed April 18, 1914. Serial No. 832,748.

*To all whom it may concern:*

Be it known that I, FRANK FLEMING, a citizen of the United States, residing at Sacramento, in the county of Sacramento and State of California, have invented certain new and useful Improvements in Piping Systems, of which the following is a specification.

This invention relates to a system of piping and more particularly to a distributing system for steam and hot water wherein the former is carried within a pipe concentric with the pipe carrying the latter.

The principal object of my invention is to produce an improved system of piping having concentric channels for a flow of water and steam.

A further object of the invention is to produce such a combination of elements as will form an effective distribution system whereby either water or steam may be independently withdrawn at any point.

A further object is to provide means for effectively connecting the concentric pipes and to provide the necessary fittings for the same.

A still further object is to produce a simple valve mechanism whereby steam may be mixed with the water in any desired amount so as to bring the latter to the required temperature.

With these and other objects in view my invention consists in the novel arrangement and combination of parts as herein described and as more specifically pointed out in the appended claims.

Figure 1:
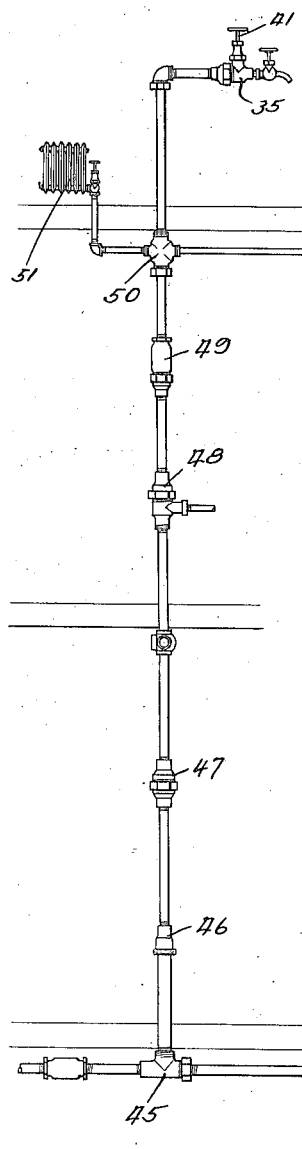
Figure 2:
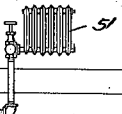
Figure 5:
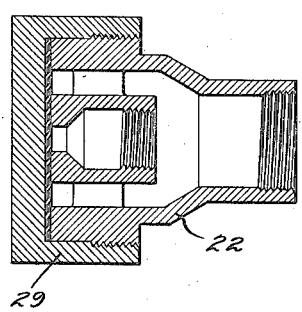
Figure 3:
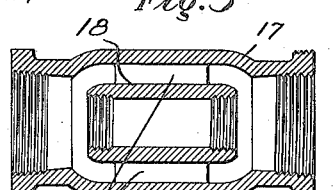
Figure 4:
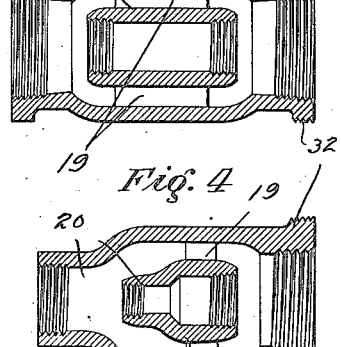
Figure 6:
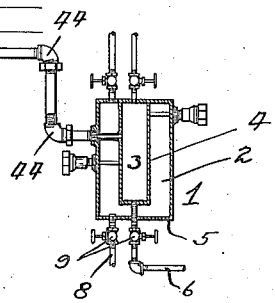
Figure 6:
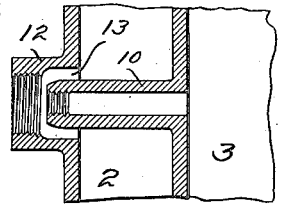

Reference should be had to the accompanying drawings forming a part of this specification wherein, Figure 1 is a view in elevation of a piping system constructed in accordance with my invention. Fig. 2 is a view in section of the union used with my invention. Fig. 3 is a view in section of the straight coupling. Fig. 4 is a view in section of a reducing coupling. Fig. 5 is a view in section of the cap used therewith. Fig. 6 is an enlarged fragmentary sectional view through the wall of the chamber wherein the steam and water enter the concentric pipes. Fig. 7 is a view in section of a cross. Fig. 8 is a view in section of a form of valve for mixing steam and water. Fig. 9 is a view in section of an elbow. Fig. 10 is a view of a T. Fig. 11 is a view of a T with a union on one end and an outlet from the center piping. Fig. 12 is a view in section on 12—12 Fig. 11. Fig. 13 is a view in elevation of the length of pipe with the ends of the outer pipe in section. Fig. 14 is a view in end elevation of a spacing collar used with my improved system. Fig. 15 is a view in section through a coupling constructed in accordance with my invention.

Referring now to Fig. 1, the numeral 1 denotes what I term an entrance manifold having an outer chamber 2 and inner concentric chamber 3 formed by the division wall 4. A pipe 6 leads to a source of steam supply, which is threaded through the bottom 5 and communicates with the interior of the inner chamber 3. A source of water supply communicates by pipe 8 with the outer chamber 2, this pipe and pipe 6 having suitable shut-off valves 9. Where it is desired to take a supply of steam and water into the concentric piping system the inner wall 3 is formed with a nipple 10 projecting into a nipple 12 formed in the outer wall thus leaving a passage 13 around the nipple 10 communicating with the outer chamber 2. Both of these nipples are screw threaded with the standard pipe threads, the nipple 12 receiving the outer pipe and the nipple 10 the smaller pipe, which fits within the former and provides an annular space therebetween in which the water may flow. This is clearly illustrated in Fig. 13 wherein 15 denotes the outer pipe and 16 the inner pipe, and 14 the annular space therebetween.

In this system, concentricity is carried throughout the various fittings and connection as illustrated in detail in Figs. 2 to 11 inclusive. Fig. 3 illustrates the form of coupling employed wherein the outer sleeve 17 is threaded to receive the outer pipe 15 and inner sleeve 18 is threaded to receive the inner pipe 16, the two sleeves being connected by two or more radial arms 19. The reducing coupling in Fig. 4 is constructed in a similar manner except that both sleeves are reduced on one end as shown at 20.

It will be obvious that it would be difficult to use such couplings except where on the other end of the pipes a union is employed and Fig. 13 shows the two halves of this union. The right hand end of the pipe is shown in engagement with ½ of a union, but a coupling or other fitting of the type shown in Figs. 7, 9 and 10 might replace this member. The left hand end shows the other half of a union made in two pieces, which are separately attachable to the inner and outer pipes.

The fitting shown in Fig. 14 is provided to center the inner pipe with the outer and comprises a collar 55 having radial arms 56. The collar 55 is split as shown at 57 and being bored a trifle smaller than the outer diameter of the inner pipe it is necessary to spring it apart when it is slipped over the same and hence it is held frictionally engaged therewith. Passageways 58 between the radial arms allow the flow of fluid to pass the collar.

In the union shown in Fig. 2 the members screwed upon the outer pipe are denoted by 21 and 22, and 23 and 24 are the members screwed to the inner pipe, the two members of each part being connected and held in rigid relation by the radial arms 25. The member 22 is exteriorly screw threaded to receive a nut 26, and the member 21 is provided with a shoulder 27 against which the lip 28 of this nut abuts, and 29 denotes a suitable form of packing.

In use the inner and outer pipes are screwed into the inner and outer sleeves, respectively, the nut 26 being placed over the sleeve 21 before screwing the pipe therein. The two pipes are brought together and the nut screwed on to the member 22 as in the usual style of union drawing the two parts tightly together.

Where it is desired to close the end of both pipes a cap 29 is provided, which fits over the end of the member similar to 22, compresses a gasket over the ends thereof and effectively closes both channels.

The crosses, elbows and T's as shown in Figs. 7, 9 and 10 respectively, are constructed by forming inner and outer concentric crosses, elbows and T's of the usual form and connecting the two by means of radial arms 30, which hold the parts in rigid relation and provide an annular passage around the interior member.

In all these fittings I prefer to provide an interior thread 31 on the outer member and an outer thread 32 on the same member so that these members may be used as one part of the union. In order to adapt any end to form the union I provide the nipple 32', Figs. 11 and 12, with a plate 33 concentric therewith and integrally attached by arms 34. The nipple 32' is adapted to be placed in threaded engagement with the interior member of the fitting and when screwed therein by means of a special wrench inserted in the passageway 34' the plate 33 is brought into contact with the edge of the outer member of the fitting. Then by employing a half union with a nut 26 the latter engaging the threads 32 of the fitting any pipe may be connected as by the union.

Fig. 11 illustrates also a form of fitting where it is desired to secure a supply of steam from the inner channel and Fig. 8 illustrates a fitting, which allows a certain amount of steam from the inner channel to be mixed with the water from the outer. The latter fitting denoted by the numeral 35 consists of an outer casing 36 and inner casing 37 wherein is formed a valve seat 38. The outer casing is threaded as at 39 to receive a bonnet 40 through which passes the threaded valve stem 41. On the lower end of the latter is provided a disk 30' adapted to seat in 38. By raising this disk the steam from the inner channel may flow into and mix with the water in the outer channel and in the end 42 is provided a connection to a water faucet or other outlet for this heated mixture.

In use the various fittings are assembled into complete system as shown at Fig. 1 wherein 44 denotes elbows as illustrated in Fig. 9, each elbow having a union coupling on one side. 45 denotes a T as illustrated in Fig. 10 also having a union coupling on one side and the pipe being plain threaded into the other side and the side outlet. 46 is a reducing coupling as shown in Fig. 4, one end being provided with a union. A straight union is shown at 47, and 48 is a fitting as shown in Fig. 11, where steam is brought out of the side to be used in any suitable device. A straight coupling 49 is shown having the union on one end and 50 is a cross provided with side outlets by which steam is taken to the radiators 51. These two outlets being arranged in the manner as outlet 52, Fig. 11. 35 denotes the fitting shown in Fig. 8 to which is attached the faucet providing the water outlet.

Chambers 3 and 2 are filled with steam and water through pipes 6 and 8 respectively, the steam passing out through nipples 10 into the inner pipe of the system and water through passage 13 into the outer pipe, where it becomes heated and may be withdrawn at any point thus doing away with separate boilers for heating the same.

While I have shown the preferred embodiment of my invention and a number of fittings it will be obvious that minor changes in detail and construction may be resorted to without changing the spirit of my invention.

What I claim is:—

1. In combination with a pipe fitting having an inner tube, an outer tube concentric therewith and forming an annular passage around said inner tube; a nipple, a flange formed on the outer end of said nipple having passageways therein adapted to aline with the annular passage around said inner tube, and screw threads formed on the end of said nipple adapted to engage with said inner tube and pull said flange tight against the end of said outer tube.

2. In combination with a pipe fitting having inner tubes, outer tubes concentric therewith and forming an annular passage around said inner tube; a nipple, a flange formed on the outer end of said nipple having passageways therein adapted to aline with the annular passage around said inner tube, threads formed on the end of said nipple adapted to engage with said inner tubes and pull said flange tight against the end of said outer tube, a half union having an inner and outer tube adapted to aline with the tubes of said fitting and a nut loosely mounted on said half union to screw on the outside of said fitting and tighten said half union to said flange and fitting.

3. A pipe coupling for concentrically spaced pipes comprising members adapted to be screwed on the outer of said pipes, external threads formed on one of said members, a shoulder formed on the other of said members, a flanged nut adapted to bear against said shoulder and be brought into threaded engagement with the external threads of said other member, sleeves concentrically spaced within said outer members and adapted to be screwed into the inner of said spaced pipes, and flanges formed on said sleeves adapted to bear against the end of said members, said flanges having passageways adapted to aline with the passageway between said members and said sleeves, and said flanges being held in contact with each other by said flanged nut.

4. A pipe coupling for concentrical pipes comprising two halves and a nut loosely mounted over one half to screw on the threaded portion of the other half and tighten both halves together; each half of said coupling being composed of an outer member, a plate having passageway alining with the passageways of said concentric pipes, a sleeve extending from said plate adapted to engage the inner of said concentric pipes and draw the inner surface of said flange against the outer surface of said outer member, the outer surfaces of said plates being held together by said nut.

5. In combination with a pipe fitting comprising an inner tube, outer tube, radial arms spacing said outer tube concentric with said inner tube, and providing a passageway therebetween, screw threads formed on the inner surface of said inner and said outer tubes, and said outer tube having external screw threads; a nipple, a flange on the outer end of said nipple having passageways therein adapted to aline with the annular passage around said inner tube, threads on the end of said nipple adapted to engage in said inner tube and pull said plate tight against the end of said outer tube, a half union having an inner and outer tube adapted to aline with the tubes of said fitting and a nut loosely mounted on said half union to engage the external threads of said fitting and tighten said half union against said flange.

6. In combination with a fitting for concentric pipes and having concentrically spaced inner and outer tubular walls forming concentric passageways, a nipple, a flange on the outer end of said nipple having passageways therein adapted to aline with the outer passageway between said tubular walls, screw threads formed on the end of said nipple to engage with threads on the interior of said inner walls and pull said nipple and said flange tight against the outer end of said fitting, a half union consisting of an outer member, a plate and sleeve with concentrical passageways therebetween, a seat formed on said plate, a flanged nut to engage with the external threads of named fitting and tighten said plate and sleeve against the seat of said flange and fitting.

7. A half union for concentrical pipes comprising a member with an interior threaded end to receive connection with the outer pipe, a plate and sleeve provided with inner and outer passageways, threads formed on the interior end of said sleeve to receive connection with the inner pipe, a flanged nut to engage with the external threads of a pipe fitting having concentrical passageways and tightening said plate against the seat of named fitting.

In testimony whereof I affix my signature in presence of two witnesses.

FRANK FLEMING.

Witnesses:
W. A. STOCK,
R. M. OYARZO.